US008800006B2

(12) United States Patent
Chickering et al.

(10) Patent No.: US 8,800,006 B2
(45) **Date of Patent: *Aug. 5, 2014**

(54) AUTHENTICATION AND AUTHORIZATION IN NETWORK LAYER TWO AND NETWORK LAYER THREE

(75) Inventors: Roger Chickering, Granite Bay, CA (US); Derek Brown, San Jose, CA (US); Paul Funk, Cambridge, MA (US); Oliver Tavakoli, Sudbury, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/601,546

(22) Filed: Aug. 31, 2012

(65) Prior Publication Data

US 2012/0331530 A1 Dec. 27, 2012

Related U.S. Application Data

(63) Continuation of application No. 11/742,370, filed on Apr. 30, 2007, now Pat. No. 8,281,371.

(51) Int. Cl.
*H04L 29/06* (2006.01)
*G06F 21/57* (2013.01)

(52) U.S. Cl.
CPC .............. *H04L 63/20* (2013.01); *H04L 63/102* (2013.01); *H04L 63/0869* (2013.01); *H04L 63/0892* (2013.01); *G06F 21/577* (2013.01)
USPC ........ 726/4; 726/11; 726/25; 726/29; 726/30; 709/219; 709/225; 713/176; 713/180

(58) Field of Classification Search
CPC ... H04L 63/20; H04L 63/102; H04L 63/0892; H04L 63/0869; G06F 21/577
USPC ................ 709/219, 225; 726/1–4, 11, 24, 25; 713/201
See application file for complete search history.

(56) References Cited

U.S. PATENT DOCUMENTS

| | | | | |
|---|---|---|---|---|
| 7,054,944 | B2 * | 5/2006 | Tang et al. | 709/229 |
| 2004/0107360 | A1 * | 6/2004 | Herrmann et al. | 713/201 |
| 2004/0167984 | A1 * | 8/2004 | Herrmann | 709/229 |
| 2004/0205043 | A1 * | 10/2004 | Alessi et al. | 707/2 |
| 2006/0005254 | A1 * | 1/2006 | Ross | 726/27 |
| 2007/0136800 | A1 * | 6/2007 | Chan et al. | 726/10 |
| 2007/0214352 | A1 * | 9/2007 | Convery et al. | 713/153 |
| 2007/0282855 | A1 * | 12/2007 | Chen et al. | 707/10 |
| 2008/0092223 | A1 * | 4/2008 | Setia et al. | 726/11 |

OTHER PUBLICATIONS

C.R. Livingston, et al., "Remote Authentication Dial in User Services (RADIUS)," Internet Engineering Task Force, Request for Comment 2058, pp. 1-53, Jan. 1997.
C.R. Livingston, "RADIUS Accounting," Internet Engineering Task Force, Request for Comment 2059, pp. 1-21, Jan. 1997.

(Continued)

*Primary Examiner* — Pramila Parthasarathy
*Assistant Examiner* — Hee Song
(74) *Attorney, Agent, or Firm* — Harrity & Harrity, LLP

(57) ABSTRACT

A method may include authenticating a node over layer 2 in a network based on authentication rules; sending a node authentication code to the node; and providing layer 3 network access based on the node authentication code.

20 Claims, 11 Drawing Sheets

100

USER DATABASE SERVER 150
MONITORING COMPUTER 170
PROTECTED NETWORK 125
POLICY SERVER 140
FIREWALL 160
NETWORK ACCESS SERVER 130
NETWORK 120
SESSION 112
NODE 110

(56) References Cited

OTHER PUBLICATIONS

C.R. Livingston, et al., "Remote Authentication Dial in User Services (RADIUS)," Internet Engineering Task Force, Request for Comment 2138, pp. 1-54, Apr. 1997.
C.R. Livingston, "RADIUS Accounting," Internet Engineering Task Force, Request for Comment 2139, pp. 1-21, Apr. 1997.
G. Zorn, "Microsoft Vendor-specific RADIUS Attributes," Internet Engineering Task Force, Request for Comment 2548, pp. 1-34, Mar. 1999.
B. Aboba et al., "RADIUS Authentication Client MIB," Internet Engineering Task Force, Request for Comment 2618, pp. 1-12, Jun. 1999.
G. Zorn et al., "RADIUS Authentication Server MIB," Internet Engineering Task Force, Request for Comment 2619, pp. 1-14, Jun. 1999.
B. Aboba et al., "RADIUS Accounting Client MIB," Internet Engineering Task Force, Request for Comment 2620, pp. 1-11, Jun. 1999.
G. Zorn et al., "RADIUS Accounting Server MIB," Internet Engineering Task Force, Request for Comment 2621, pp. 1-13, Jun. 1999.
B. Aboba et al., "Implementation of L2TP Compulsory Tunneling via RADIUS," Internet Engineering Task Force, Request for Comment 2809, pp. 1-19, Apr. 2000.
C. Rigney, et al., "Remote Authentication Dial in User Service (RADIUS)," Internet Engineering Task Force, Request for Comment 2865, pp. 1-63, Jun. 2000.
C. Rigney, "RADIUS Accounting," Internet Engineering Task Force, Request for Comment 2866, pp. 1-24, Jun. 2000.
G. Zorn et al., "RADIUS Accounting Modifications for Tunnel Protocol Support," Internet Engineering Task Force, Request for Comment 2867, pp. 1-10, Jun. 2000.
G. Zorn et al., "RADIUS Attributes for Tunnel Protocol Support," Internet Engineering Task Force, Request for Comment 2868, pp. 1-17, Jun. 2000.
C. Rigney, et al., "RADIUS Extensions," Internet Engineering Task Force, Request for Comment 2869, pp. 1-39, Jun. 2000.
D. Mitton, "Network Access Servers Requirements: Extended RADIUS Practices," Internet Engineering Task Force, Request for Comment 2882, pp. 1-14, Jul. 2000.
B. Aboba et al., "RADIUS and IPv6," Internet Engineering Task Force, Request for Comment 3162, pp. 1-10, Aug. 2001.
B. Aboba, "IANA Considerations for RADIUS," Internet Engineering Task Force, Request for Comment 3575, pp. 1-7, Jul. 2003.
M. Chiba, et al., "Dynamic Authorization Extensions to Remote Authentication Dial in User Service (RADIUS)," Internet Engineering Task Force, Request for Comment 3576, pp. 1-25, Jul. 2003.
B. Aboba et al., "RADIUS (Remote Authentication Dial in User Service) Support for Extensible Authentication Protocol (EAP)," Internet Engineering Task Force, Request for Comment 3579, pp. 1-38, Sep. 2003.
P. Congdon, et al., "IEEE 802.1X Remote Authentication Dial in User Service (RADIUS) Usage Guidelines," Internet Engineering Task Force, Request for Comment 3580, pp. 1-25, Sep. 2003.
R. Droms, et al., "Remote Authentication Dial-In User Service (RADIUS) Attributes Suboption for the Dynamic Host Configuration Protocol (DHCP) Relay Agent Information Option," Internet Engineering Task Force, Request for Comment 4014, pp. 1-7, Feb. 2005.
B. Sterman, et al., "RADIUS Extension for Digest Authentication," Internet Engineering Task Force, Request for Comment 4590, pp. 1-27, Jul. 2006.
D. Nelson, "RADIUS Authentication Client MIB for IPv6," Internet Engineering Task Force, Request for Comment 4668, pp. 1-20, Aug. 2006.
D. Nelson, "RADIUS Authentication Server MIB for IPv6," Internet Engineering Task Force, Request for Comment 4669, pp. 1-21, Aug. 2006.
D. Nelson, "RADIUS Accounting Client MIB for IPv6," Internet Engineering Task Force, Request for Comment 4670, pp. 1-19, Aug. 2006.
D. Nelson, "RADIUS Accounting Server MIB for IPv6," Internet Engineering Task Force, Request for Comment 4671, pp. 1-20, Aug. 2006.
S. DeCnodder, et al., "RADIUS Dynamic Authorization Client MIB," Internet Engineering Task Force, Request for Comment 4672, pp. 1-19, Sep. 2006.
S. DeCnodder, et al., "RADIUS Dynamic Authorization Server MIB," Internet Engineering Task Force, Request for Comment 4673, pp. 1-20, Sep. 2006.
P. Congdon, et al., "RADIUS Attributes for Virtual LAN and Priority Support," Internet Engineering Task Force, Request for Comment 4675, pp. 1-13, Sep. 2006.
V. Mammoliti, et al., "DSL Forum Vendor-Specific RADIUS Attributes," Internet Engineering Task Force, Request for Comment 4679, pp. 1-21, Sep. 2006.
J. Salowey, "RADIUS Delegated-IPv6-Prefix Attribute," Internet Engineering Task Force, Request for Comment 4818, pp. 1-6, Apr. 2007.
B. Aboda, et al., "Extensible Authentication Protocol (EAP)," Internet Engineering Task Force, Request for Comment 3748, pp. 1-67, Jun. 2004.
B. Aboda, et al., "PPP EAP TLS Authentication Protocol," Internet Engineering Task Force, Request for Comment 2716, pp. 1-24, Oct. 1999.
Co-pending U.S. Appl. No. 11/742,370, filed Apr. 30, 2007, Chickering et al., entitled: "Authentication and Authorization in Network Layer Two and Network Layer Three", 43 pages.

* cited by examiner

100

ROLE MAPPING TABLE 344

| | CONDITION 412 | ROLE 416 |
|---|---|---|
| 420 | USERNAME = SMITH | EMPLOYEE, MAIL, DOCS |
| 422 | USERNAME = JONES | EMPLOYEE, MAIL |
| 424 | USERNAME = VISITOR | GUEST |
| 426 | VIRUS SOFTWARE = INSTALLED | HEALTHY |

•
•
•

LAYER TWO POLICY TABLE 346

| | ROLE 432 | VLAN 436 |
|---|---|---|
| 438 | NOT HEALTHY | QUARANTINE VLAN |
| 440 | GUEST | GUEST VLAN |
| 442 | EMPLOYEE | ACCESS VLAN |

| | SESSION 112 | SESSION A | SESSION B |
|---|---|---|---|
| SESSION ID | 70F864 | 70F865 | 70F866 |
| NODE AUTHENTIC. CODE | A5DF9087 | B767D98 | C897F95 |
| NETWORK ADDRESS | 1.2.3.7 | 1.2.3.6 | 1.2.3.8 |
| USERNAME | SMITH | JONES | VISITOR |
| ROLES | EMPLOYEE, MAIL, DOCS, HEALTHY | EMPLOYEE, MAIL | GUEST, HEALTHY |

502
504
510
518
520
CST 348

FIG. 5

| DESTINATION NETWORK ADDRESS 902 | ROLE 904 | ACTION 906 |
| --- | --- | --- |
| QUARANTINE SERVER [192.168.1.1] | ALL | PERMIT |
| ALL [*.*.*.*] | NOT HEALTHY | DENY |
| MAIL SERVER [192.168.1.3] | MAIL | PERMIT |
| DOCS SERVER [192.168.1.2] | DOCS | PERMIT |

| SOURCE NETWORK ADDRESS 942 | ROLE 944 |
| --- | --- |
| 1.2.3.6 [JONES] | EMPLOYEE, MAIL |
| 1.2.3.7 [SMITH] | EMPLOYEE, MAIL, DOCS, HEALTHY |
| 1.2.3.8 [VISITOR] | GUEST, HEALTHY |

AUTHENTICATION AND AUTHORIZATION IN NETWORK LAYER TWO AND NETWORK LAYER THREE

RELATED APPLICATION

This application is a continuation of U.S. patent application Ser. No. 11/742,370 filed Apr. 30, 2007, now U.S. Pat. No. 8,281,371, the disclosure of which is incorporated herein by reference.

BACKGROUND

Internet service providers (ISPs), enterprise IT departments and other network providers may provide networks that implement Authentication, Authorization, and/or Accounting (AAA). Such AAA protocols may include the Remote Authentication Dial-In User Service (RADIUS) and the Extensible Authentication Protocol (EAP), which is an authentication framework.

The Open Systems Interconnection (OSI) Model is a layered, abstract description for communications and computer network protocol design. The seven layers include: (1) physical, (2) data link, (3) network, (4) transport, (5) session, (6) presentation, and (7) application. EAP may run over the data link layer (layer 2) and or within a secure connection (e.g., using layer 3 and above) using transport layer security (TLS), for example.

The RADIUS protocol specification is maintained by a working group of the Internet Engineering Task Force (IETF) as described in RFC 2865 and 2866. The EAP specification is maintained by a working group of the IETF as described in RFCs 3748 and 2716.

SUMMARY

According to one aspect a method may include authenticating a node over layer 2 in a network based on authentication rules; sending a node authentication code to the node; and providing layer 3 access in the network based on the node authentication code.

According to another aspect, a method may include authenticating a first node in a network over layer 2 based on authentication rules; authorizing access to resources in the network over layer 2 by the first node based on layer 2 authorization rules; authenticating a second node in a network over layer 3 based on the authentication rules used to authenticate the first node in the network over layer 2; and authorizing access to resources in the network over layer 3 by the second node based on layer 3 authorization rules.

BRIEF DESCRIPTION OF THE DRAWINGS

The accompanying drawings, which are incorporated in and constitute a part of this specification, illustrate one or more embodiments described herein and, together with the description, explain aspects of the invention. In the drawings.

FIG. 4 is a diagram of an exemplary role mapping table and a layer 2 policy table;

FIG. 5 is a diagram of an exemplary current sessions table;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Exemplary Environment

Figure 1:
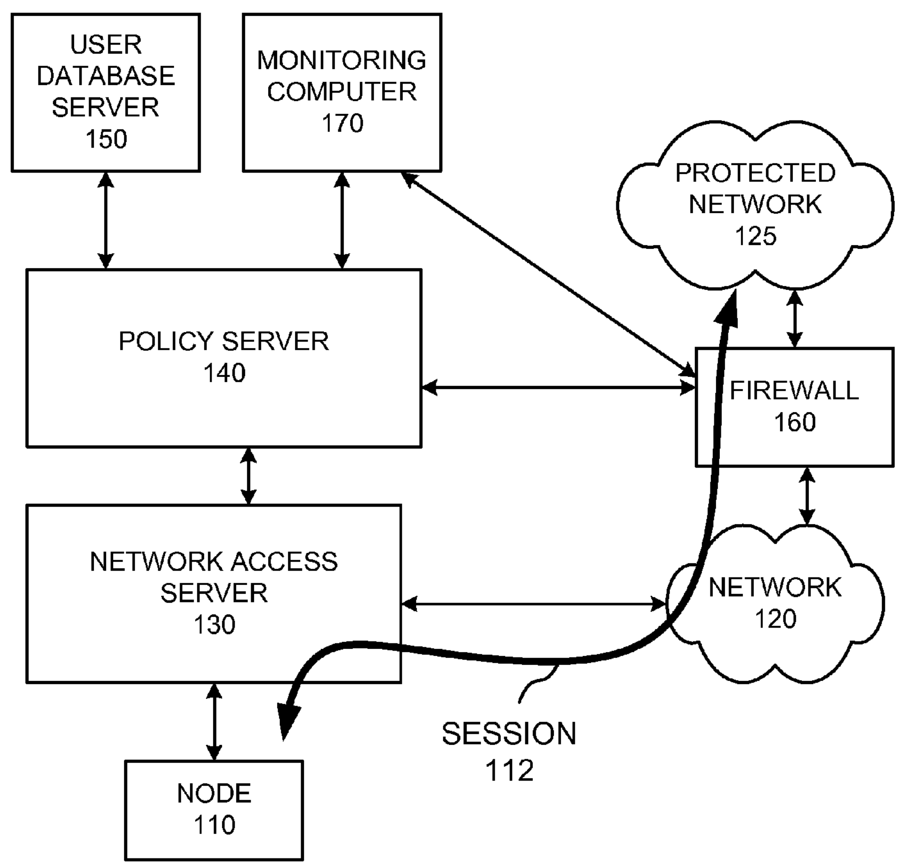
FIG. 1 is a block diagram of an exemplary environment in which embodiments described herein may be implemented.

FIG. 1 is a diagram of an exemplary environment 100 in which systems and methods described herein may be implemented. Environment 100 may include a node 110, a session 112, a network 120, a protected network 125, a network access server 130 ("NAS 130"), a policy server 140, a user database server 150, a firewall 160, and a monitoring computer 170. In practice, there may be more, different, or fewer devices or a different arrangement of devices than what is shown in FIG. 1. For example, environment 100 may include one or more nodes other than node 110. Further, while FIG. 1 shows NAS 130, policy server 140, user database server 150, firewall 160, and monitoring computer 170 in environment 100, one or more of these devices may be remotely located, e.g., the devices may be geographically diverse. In one embodiment, NAS 130, policy server 140, firewall 160, monitoring computer 170, and/or user database server 150 may be combined into a single server. In addition, any of the elements in the environment may consist of a cluster of two or more devices configured for high availability and/or load balancing.

Communication among node 110, networks 120 and 125, NAS 130, policy server 140, user database server 150, firewall 160, and monitoring computer 170 may be accomplished via wired and/or wireless communication connections. Although arrows in FIG. 1 may indicate communication directly between devices, communication may be indirect. Further, although NAS 130, policy server 140, and firewall 160 may be referred to as "servers," the term "server" as used herein may mean any type of computer.

Node 110 may include a mobile telephone, a land-line telephone, a computer, e.g., a desktop or a laptop, or any other type of user or server device. Node 110 may communicate with NAS 130 for the purposes of establishing session 112 with network 120. Session 112 may be a lasting connection between node 110 and network 120 that may, for example, involve the exchange of many packets between node 110 and network 120. Session 112 may include, for example, one or more telephone calls or data access to network 120, including web browsing, email, and client/server applications.

Node 110 may communicate with NAS 130 via any type of wired and/or wireless communication connections. In one embodiment, node 110 may communicate with NAS 130 via a cable directly connecting a port on node 110 with a port on NAS 130. In another embodiment, node 110 may communicate with NAS 130 via a wireless network. In yet another embodiment, node 110 may communicate with NAS 130 via a public switched telephone network (PSTN). In another embodiment, node 110 communicates with NAS 130 via a mobile telephone network. In yet another embodiment, node 110 may communicate with NAS 130 via the Internet. Node 110 may be associated with a user and a username, e.g., the username may identify node 110 and the user of node 110, and vice versa. In other embodiments, node 110 is not necessarily associated with any particular username.

Network 120 may include a wide-area network (WAN), e.g., the Internet, a local-area network (either wired or wireless), a telephone network, e.g., the Public Switched Telephone Network (PSTN), an intranet, a private corporate network, or a combination of networks. Network 120 may provide services, such as applications and/or content, to nodes, such as node 110.

Network 125 may include a wide-area network (WAN), e.g., the Internet, a local-area network (either wired or wireless), a telephone network, e.g., the Public Switched Telephone Network (PSTN), an intranet, a private corporate network, or a combination of networks. Network 120 may provide services, such as applications and/or content, to nodes, such as node 110.

NAS 130 may communicate with nodes, such as node 110, and provide access to network 120 for sessions, such as session 112. NAS 130 may communicate with policy server 140 to request connections to network 120 for nodes. For example, NAS 130 may pass information about node 110, such as a username, password, and/or configuration information (associated with node 110), to policy server 140 for authentication of node 110. NAS 130 may include one or more network access servers that may be co-located or remotely located, e.g., geographically diverse. NAS 130 may include a wireless access point ("WAP"), such as a wireless router. In another embodiment, NAS 130 may include a switch.

Policy server 140 may receive requests, such as authorization and authentication requests, from NAS 130 for nodes to connect to network 120. For example, policy server 140 may receive information from NAS 130 to authenticate node 110 to establish session 112. Policy server 140 may communicate with user database server 150 to query user names, user passwords, and/or privileges associated with a node, such as node 110. The policy server 140 may provision layer 3 access for node 110 after node 110 has established a control channel with policy server 140. Policy server 140 may specify what privileges users have to access services provided by network 120. In other words, policy server 140 may store authorization rules. Alternatively, user database server 150 may store authorization rules.

Policy server 140 may store information regarding session 112 and node 110, for example. Policy server 140 may also communicate with firewall 160 to provision access, e.g., layer 3 access, for nodes, such as node 110, to access protected network 125. Policy server 140 may include one or more RADIUS servers. In one embodiment, the one or more RADIUS servers may be co-located or remotely located, e.g., geographically diverse.

User database server 150 may include a user database that may specify usernames and other credentials for establishing sessions with network 120. In other words, user database server 150 may store authentication rules.

Firewall 160 may block or allow network traffic to pass from, for example, network 120 to protected network 125. Firewall 160 may block or allow traffic, for example, based on source address, destination address, source port, destination port, and protocol. Firewall 160 may receive instructions from policy server 140 regarding what network traffic to pass from network 120 to network 125. Firewall 160 may provide for blocking or allowing traffic at layer 2 or layer 3. For example, firewall 160 may inspect source IP addresses and/or destination IP addresses when determining whether to forward or drop traffic.

Monitoring computer 170 may monitor the data stored by policy server 140 and firewall 160. For example, monitoring computer 170 may include a billing application that retrieves information about sessions and generates bills. Monitoring computer 170 may also archive information about network services accessed by nodes for auditing of network access.

Network Access Server

Figure 2:
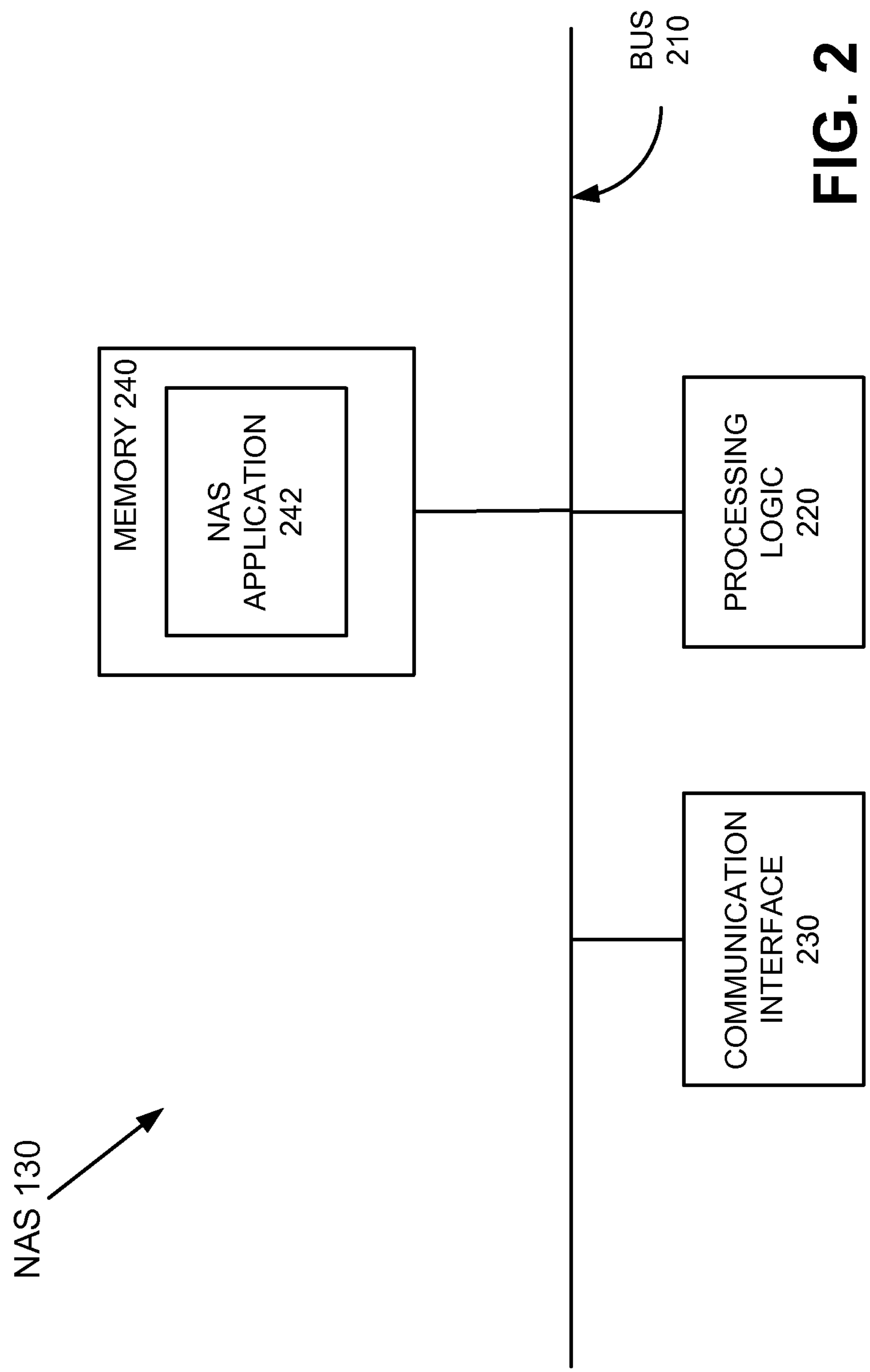
FIG. 2 is a block diagram of exemplary components in a network access server.

FIG. 2 is a block diagram of exemplary components in NAS 130. As shown in FIG. 2, NAS 130 may include a bus 210, processing logic 220, a communication interface 230, and a memory 240. NAS 130 may include other components (not shown) that aid in receiving, transmitting, and/or processing data. Moreover, other configurations of components in NAS 130 are possible.

Bus 210 may include a path that permits communication among the components of NAS 130. Processing logic 220 may include any type of processor or microprocessor that interprets and executes instructions. In other embodiments, processing logic 220 may include an application specific integrated circuit (ASIC), field programmable gate array (FPGA), or the like.

Communication interface 230 may include any transceiver-like mechanism that enables NAS 130 to communicate with other devices and/or systems. Communication interface 230 may allow for wired or wireless communications. In one implementation, communication interface 230 may allow for NAS 130 to be controlled and/or administered remotely by an operator or an administrator.

Memory 240 may include a random access memory (RAM) or another type of dynamic storage device that may store information and instructions for execution by processing logic 220; a read only memory (ROM) device or another type of static storage device that may store static information and instructions for use by processing logic 220; and/or some other type of magnetic or optical recording medium and its corresponding drive for storing information and/or instructions. Memory 240 may store NAS application 242. NAS application 242 may include instructions for causing NAS 130 to implement an authentication and/or authorization protocol to establish sessions between nodes and network 120. Such an authentication and/or authorization protocol may include 802.1X and/or RADIUS.

NAS 130 may perform certain operations, as described in detail below. NAS 130 may perform these operations in response to processing logic 220 executing software instructions contained in a computer-readable medium, such as memory 240. A computer-readable medium may be defined as a physical or logical memory device and/or carrier wave. The software instructions may be read into memory 240 from another computer-readable medium or from another device via communication interface 230. The software instructions contained in memory 240 may cause processing logic 220 to perform processes that are described below.

Policy Server

Figure 3:
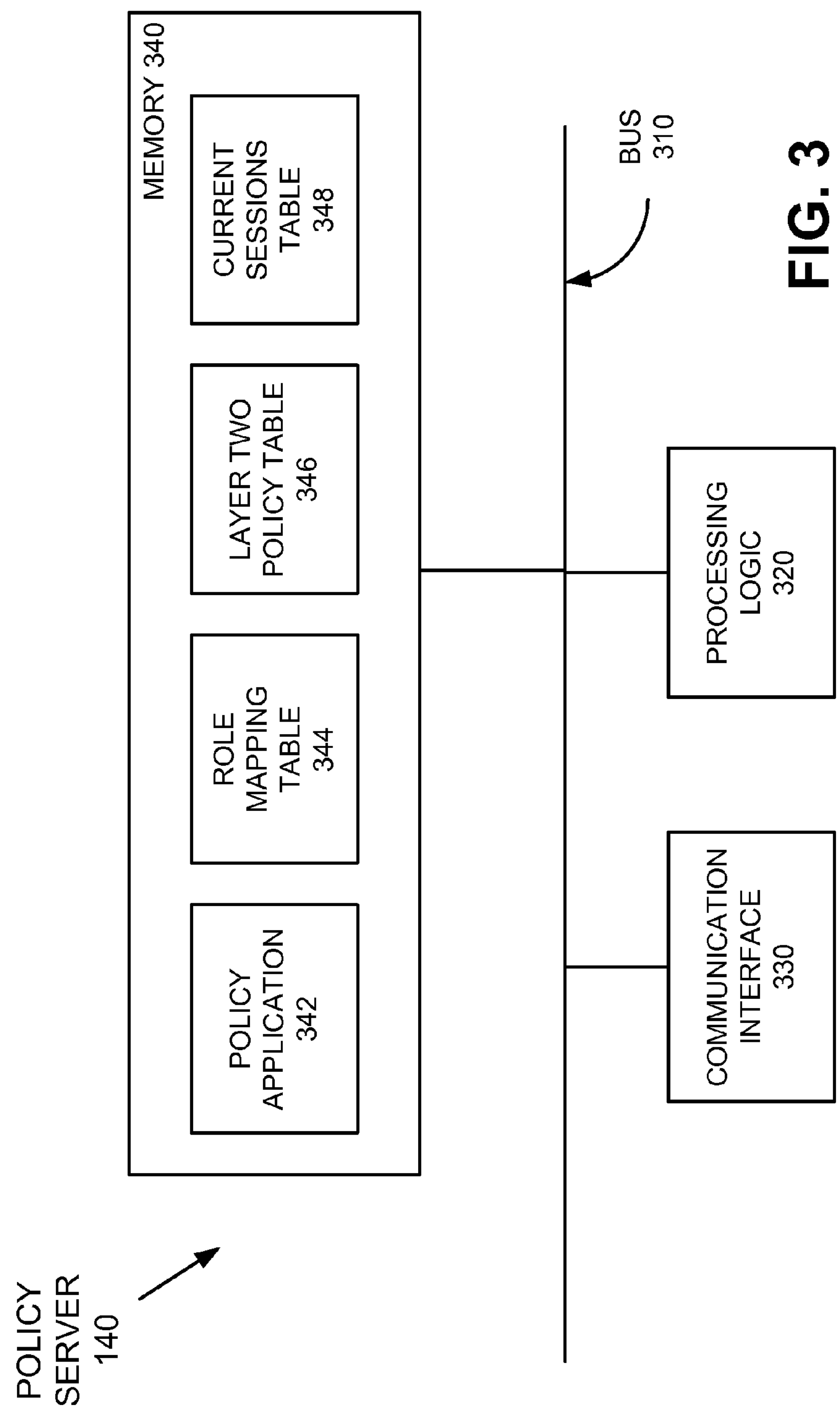
FIG. 3 is a block diagram of exemplary components in a policy server.

FIG. 3 is a block diagram of exemplary components in policy server 140. As shown in FIG. 3, policy server 140 may include a bus 310, processing logic 320, a communication interface 330, and a memory 340. Policy server 140 may include other components (not shown) that aid in receiving, transmitting, and/or processing data. Moreover, other configurations of components in policy server 140 are possible.

Bus 310 may include a path that permits communication among the components of policy server 140. Processing logic 320 may include any type of processor or microprocessor that interprets and executes instructions. In other embodiments, processing logic 320 may include an ASIC, FPGA, or the like.

Communication interface 330 may include any transceiver-like mechanism that enables policy server 140 to communicate with other devices and/or systems. In one implementation, communication interface 330 may allow for policy server 140 to be controlled and/or administered remotely by an operator or administrator.

Memory 340 may include a RAM or another type of dynamic storage device that may store information and instructions for execution by processing logic 320; a ROM device or another type of static storage device that may store static information and instructions for use by processing logic 320; and/or some other type of magnetic or optical recording medium and its corresponding drive for storing information and/or instructions. Memory 340 may store policy application 342. Policy application 342 may allow policy server 140 to implement an authentication and/or authorization protocol, such as EAP and/or RADIUS, to establish sessions between nodes, such as node 110, and network 120. Memory 340 may store role mapping table 344 and layer 2 policy table 346. Role mapping table 344 may define what roles, e.g., privileges are afforded to usernames. Layer 2 policy table 346 may define the layer 2 resources, e.g., virtual LANs, afforded to different roles. Memory 340 may store a current sessions table (CST) 348. CST 348 may store information related to sessions, such as session 112.

Policy server 140 may perform certain operations, as described in detail below. Policy server 140 may perform these operations in response to processing logic 320 executing software instructions contained in a computer-readable medium, such as memory 340. The software instructions may be read into memory 340 from another computer-readable medium or from another device via communication interface 330. The software instructions contained in memory 340 may cause processing logic 320 to perform processes that are described below.

FIG. 4 is a diagram of an exemplary role mapping table 344 and layer 2 policy table 346. Role mapping table 344 may include a condition field 412 and a role field 418. Role mapping table 344 may include additional, different, or fewer fields than illustrated in FIG. 4.

Condition field 412 may include conditions for determining whether a user should be accorded the role in the corresponding role field 416. Roles field 416 may define allowed roles, e.g., permissions, granted to a user and/or node upon the condition in condition field 412 being satisfied.

In the exemplary embodiment of FIG. 4, role mapping table 344 may include four records 420 through 426. If the username is SMITH (record 420), the roles accorded the user or node are EMPLOYEE, MAIL (e.g., e-mail), and DOCS (e.g., document management). If the username is JONES (record 422), the roles accorded the user or node are EMPLOYEE and MAIL. If the username is VISITOR (record 424), the role accorded the user or node is GUEST. If anti-virus software is installed in the node (record 426), the role accorded the user or node is HEALTHY. Other conditions other than anti-virus software being installed may afford a username or node a HEALTHY role. If multiple conditions in condition field 412 are met, all the corresponding roles defined in role field 416 may be accorded to the node or user.

Other role mapping rules may be based on attributes or group membership, for example, returned by the user database server.

Layer 2 policy table 346 may include a role field 432 and a VLAN field 436. Layer 2 policy table 346 may include additional, different, or fewer fields than illustrated in FIG. 4. Role field 432 may correspond to the roles used in role field 416. VLAN field 436 may indicate the layer 2 resources, e.g., virtual local-area networks (VLANs), that users or nodes with the corresponding role defined in role field 432 may access. Layer 2 policy table 346 may provide rules for layer 2 authorization.

In the exemplary embodiment of FIG. 4, layer 2 policy table 346 may include three records, e.g., records 438 through 442 corresponding to the roles of NOT HEALTHY, GUEST, and EMPLOYEE. Users or nodes that lack the HEALTHY role, as defined in record 438, are assigned the VLAN labeled QUARANTINE VLAN. Users or nodes with the GUEST role, as defined in record 440, are assigned the VLAN labeled GUEST VLAN. Users or nodes with the EMPLOYEE role, as defined in record 442, are assigned the VLAN labeled ACCESS VLAN. In one embodiment, the VLAN may be assigned based on the first matching role in role field 432 (traversing the table from top to bottom, for example). In this embodiment, a user or node lacking the HEALTHY role would be assigned to the QUARANTINE VLAN even if the username or node also had a role of EMPLOYEE.

FIG. 5 is an embodiment of exemplary CST 348. CST 348 may include a session ID field 502, a node authentication code field 504, a network address field 510, a username field 518, and a roles field 520. In other implementations, CST 348 may include additional, different, or fewer fields than shown in FIG. 5.

Session ID field 502 may include a unique identifier for a session. Node authentication code field 504 may include a string associated with a session. In one embodiment, node authentication code field 504 may include a random and/or cryptographically generated string. In one embodiment, node authentication code field 504 may include a unique string. As described below, node authentication code field 504 may be used to verify that a node, such as node 110, was previously authenticated. Network address field 510 may include the network address, e.g., IP address, assigned to the node.

Username field 518 may indicate the username associated with the session. Roles field 520 may indicate the roles, e.g., privileges, associated with the session. In the exemplary embodiment of FIG. 5, CST 348 stores information related to session A, session B, and session 112. CST 348 may store information related to more than three sessions.

In the exemplary CST 348 in FIG. 5, username SMITH authenticates from a node with anti-virus software running, username JONES authenticates from a node with no anti-virus software funning, and username VISITOR authenticates from a node with anti-virus software running. As a result, and according to role mapping table 344, username SMITH has the roles of EMPLOYEE, MAIL, DOCS, and HEALTHY in roles field 520; username JONES has the roles of EMPLOYEE, and MAIL in roles field 520; username VISITOR has the roles of GUEST and HEALTHY in roles field 520.

User Database Server

Figure 6:
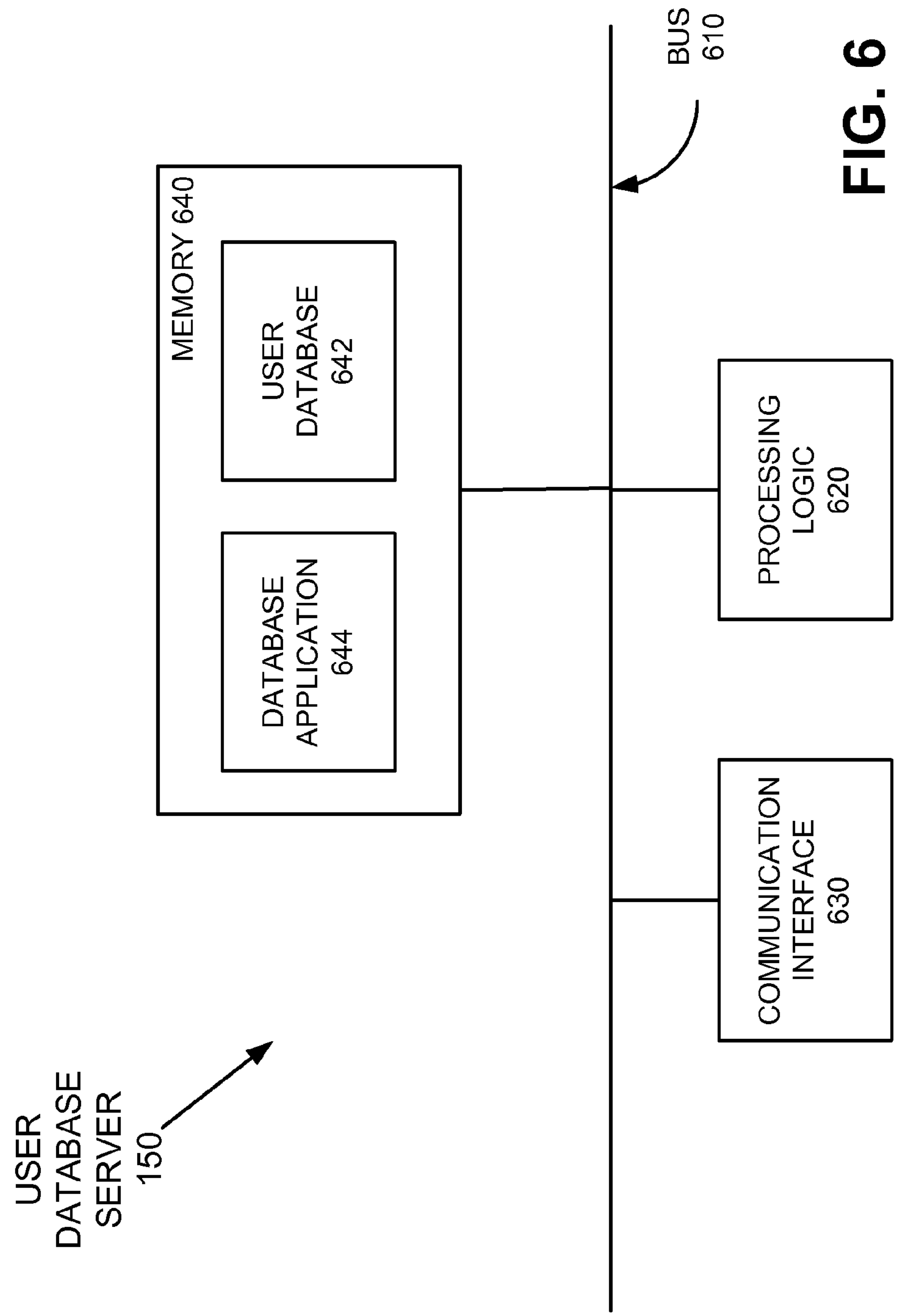
FIG. 6 is a block diagram of exemplary components in a user database server.

FIG. 6 is a block diagram of exemplary components in user database server 150. As shown in FIG. 6, user database server 150 may include a bus 610, processing logic 620, a communication interface 630, and a memory 640. User database server 150 may include other components (not shown) that aid in receiving, transmitting, and/or processing data. Moreover, other configurations of components in user database server 150 are possible.

Bus 610 may include a path that permits communication among the components of user database server 150. Processing logic 620 may include any type of processor or microprocessor that interprets and executes instructions. In other embodiments, processing logic 620 may include an ASIC, FPGA, or the like.

Communication interface 630 may include any transceiver-like mechanism that enables user database server 150 to communicate with other devices and/or systems. Communication interface 630 may allow for user database server 150 to be controlled and/or administered remotely by an operator or administrator. Communication interfaced 630 may allow policy server 140 to communicate with user database server 150 using a protocol such as LDAP or RADIUS.

Memory 640 may include a RAM or another type of dynamic storage device that may store information and instructions for execution by processing logic 620; a ROM device or another type of static storage device that may store static information and instructions for use by processing logic 620; and/or some other type of magnetic or optical recording medium and its corresponding drive for storing information and/or instructions. Memory 640 may store a user database 642, described below with respect to FIG. 5. User database 642 may include data regarding authentication and/or authorization rules. Memory 640 may store a database application program 644 to query and manage user database 642.

User database server 150 may perform certain operations, as described in detail below. User database server 150 may perform these operations in response to processing logic 620 executing software instructions contained in a computer-readable medium, such as memory 640. The software instructions may be read into memory 640 from another computer-readable medium or from another device via communication interface 630. The software instructions contained in memory 640 may cause processing logic 620 to perform processes that are described below.

Figure 7:
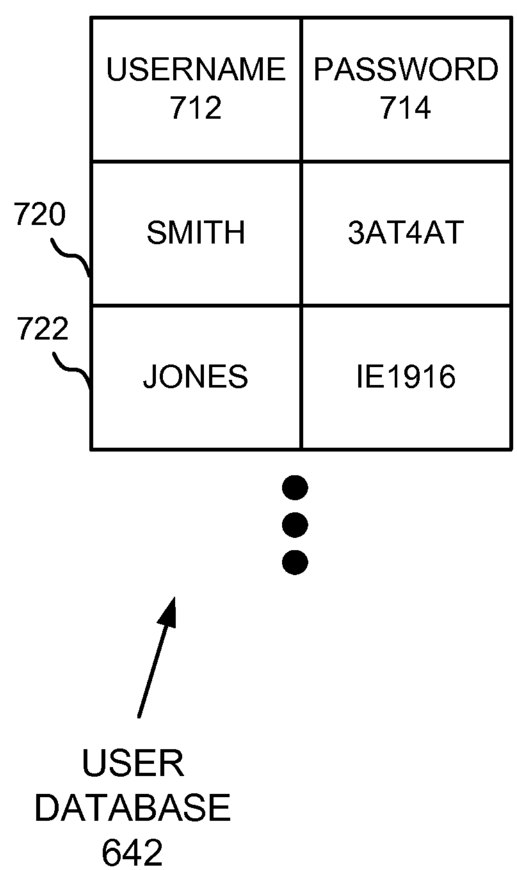
FIG. 7 is a diagram of an exemplary user database.

FIG. 7 is a diagram of an exemplary user database 642. User database 642 may include a username field 712 and a password field 714. User database 642 may include additional, different, or fewer fields than illustrated in FIG. 7. For example, user database 642 may also include fields for a client certificate, and/or a token code corresponding to usernames.

Username field 712 may include usernames of users that may have access to network 120, for example. Password field 714 may include the password for the corresponding username in username field 712. In one embodiment, password field 714 may be encrypted. Password field 714 may be used, for example, to authenticate nodes connecting to network 120. Username field 712 and password field 714 may provide authentication rules for both layer 2 and layer 3 as described below.

In the exemplary embodiment of FIG. 7, user database 642 may include two records 720 and 722 with the following usernames: SMITH and JONES. The corresponding entries in password field 714 indicate that username SMITH's password is 3AT4AT and JONES's password is IE1916.

Firewall

Figure 8:
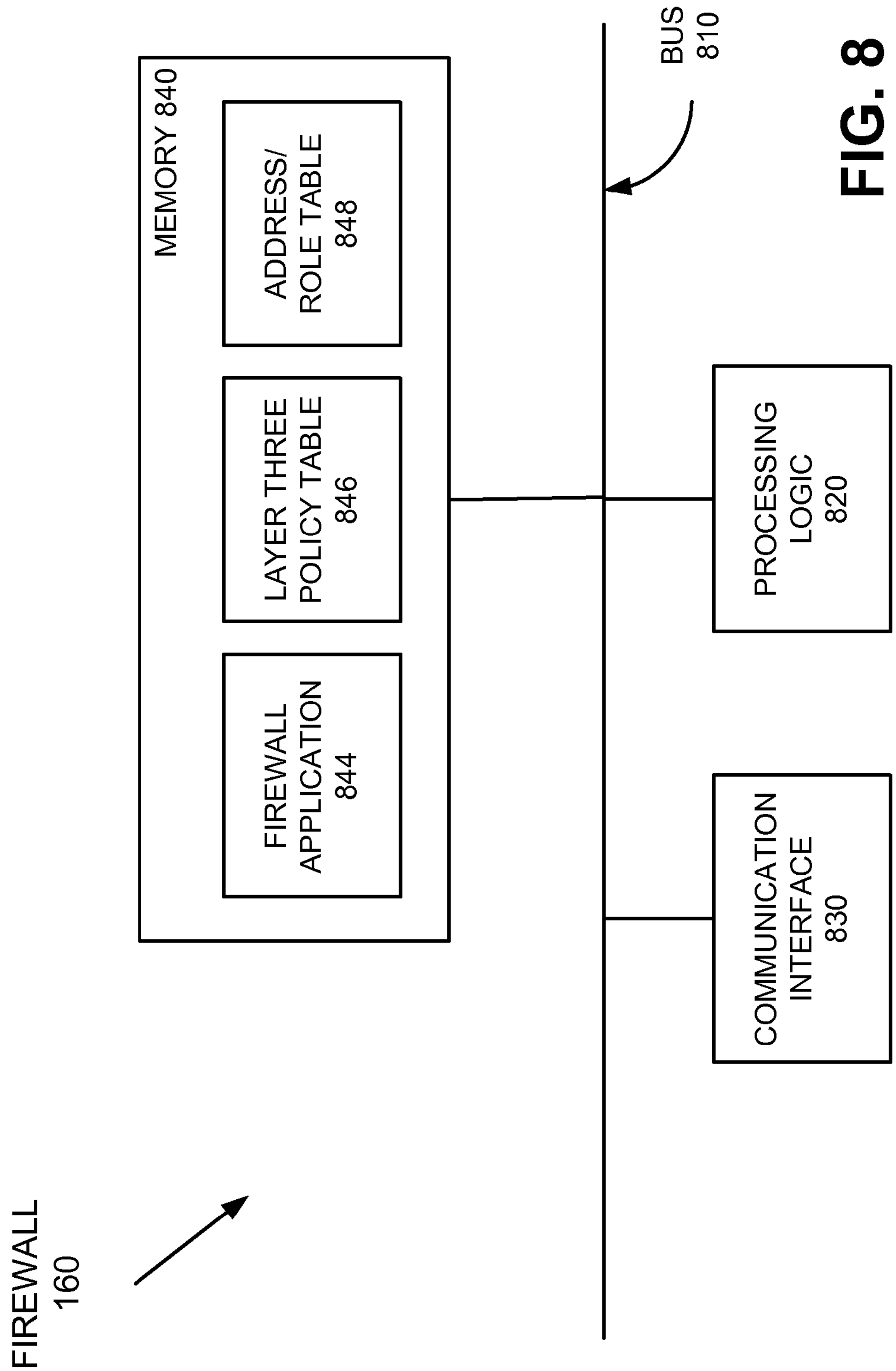
FIG. 8 is a block diagram of exemplary components in a firewall.

FIG. 8 is a block diagram of exemplary components in firewall 160. As shown in FIG. 8, firewall 160 may include a bus 810, processing logic 820, a communication interface 830, and a memory 840. Firewall 160 may include other components (not shown) that aid in receiving, transmitting, and/or processing data. Moreover, other configurations of components in NDB server are possible.

Bus 810 may include a path that permits communication among the components of firewall 160. Processing logic 820 may include any type of processor or microprocessor that interprets and executes instructions. In other embodiments, processing logic 820 may include an ASIC, FPGA, or the like.

Communication interface 830 may include any transceiver-like mechanism that enables firewall 160 to communicate with other devices and/or systems. Communication interface 830 may allow for firewall 160 to be controlled and/or administered remotely by an operator or administrator.

Memory 840 may include a RAM or another type of dynamic storage device that may store information and instructions for execution by processing logic 820; a ROM device or another type of static storage device that may store static information and instructions for use by processing logic 820; and/or some other type of magnetic or optical recording medium and its corresponding drive for storing information and/or instructions. Memory 840 may store a firewall application 842 that determines when to forward or drop network traffic. Memory 840 may also store a layer 3 policy table 846, which may include conditions for forwarding or dropping network traffic. Memory 840 may also include a network address/role table 848 that indicates the roles accorded network addresses assigned to nodes by, for example, policy server 140.

Firewall 160 may perform certain operations, as described in detail below. Firewall 160 may perform these operations in response to processing logic 820 executing software instructions contained in a computer-readable medium, such as memory 840. The software instructions may be read into memory 840 from another computer-readable medium or from another device via communication interface 830. The software instructions contained in memory 840 may cause processing logic 820 to perform processes that are described below.

Figure 9:
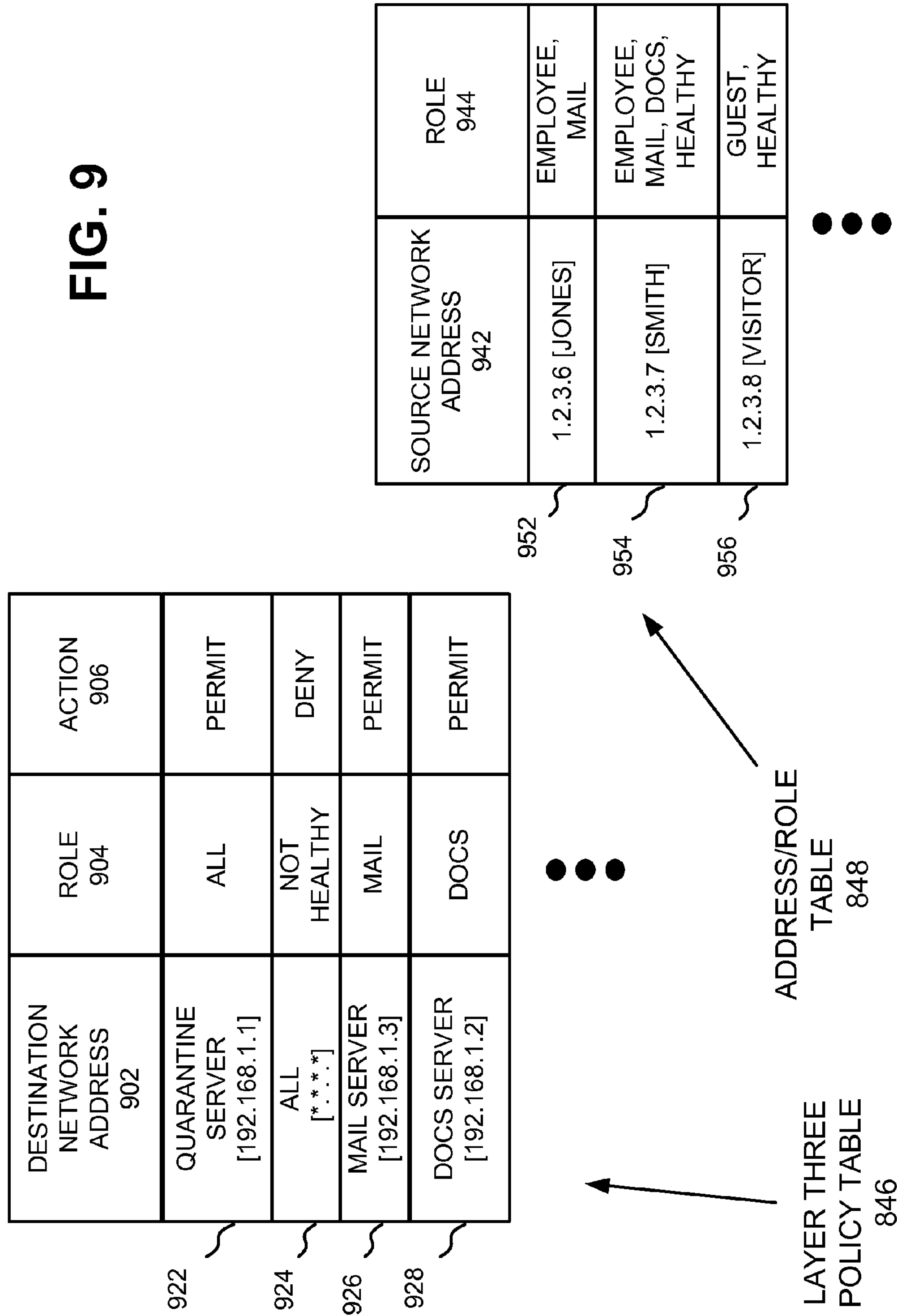
FIG. 9 is a block diagram of an exemplary layer 3 policy table and an address/role table.

FIG. 9 is a block diagram of an exemplary layer 3 policy table 846 and address/role table 848. Layer 3 policy table 846 and address/role table 848 may provide layer 3 authorization rules.

Layer 3 policy table 846 may include a destination network address field 902, a role field 904, and an action field 906. User database 642 may include additional, different, or fewer fields than illustrated in FIG. 9.

Destination network address field 902 may include the network addresses of resources in protected network 125. Role field 904 may include the role that may be allowed to access or not access the corresponding destination network address field 902. Action field 906 may include the action firewall 160 may take when receiving network traffic destined to the corresponding destination network address in field 902 from a node and/or username with the corresponding role in field 904.

In the exemplary embodiment of FIG. 9, layer 3 policy table 846 may include four records 922 through 928 with the following destination network addresses: QUARANTINE SERVER, ALL, MAIL SERVER, and DOCS SERVER. Here, ALL may designate all or any network addresses. According to the layer 3 policy table 846, all nodes or usernames may access the resource with the network address QUARANTINE SERVER. On the other hand, nodes or users without a HEALTHY role may be denied access to all network addresses. Nodes or usernames with MAIL role may be permitted to access the network resource with the network address of MAIL SERVER. Nodes or usernames with DOCS role may be permitted to access the network resource with the network address of DOCS SERVER.

Address/role table 848 may include a source network address field 942 and a role field 944. Address/role table 848 may include additional, different, or fewer fields than illustrated in FIG. 9.

Source network address field 942 may include the network addresses of nodes permitted by policy server 140 to attach to network 120 or network 125, for example. Role field 944 may include the role that policy server 140 has accorded the corresponding network address in source network address field 942.

In one embodiment, the network address/roles table may include similar information as found in CST 348, network address field 510 and roles field 520. For example, network address of 1.2.3.6 (having been assigned to username JONES) has the roles of EMPLOYEE and MAIL. Network address of 1.2.3.7 (having been assigned to username SMITH) has the roles of EMPLOYEE, MAIL, DOCS, and HEALTHY. Network address of 1.2.3.8 (having been assigned to username VISITOR) has the roles of GUEST.

In one embodiment, firewall 160 may traverse layer 3 policy table 846 from top to bottom to determine whether to permit network traffic or deny (e.g., drop) network traffic. In this embodiment, firewall 160 may execute the first action (defined in action field 906) on network traffic with a matching destination network address (defined in field 902) and role (defined in field 904). In one embodiment, firewall 160 determines the role to accord network traffic based on the source network address of the traffic. In this embodiment, firewall may query policy server 140 as to the roles accorded source network address or may traverse address/role table 848. Policy server 848 may update address/role table 848 with changes when appropriate.

In one embodiment, layer 3 access table 846 may also be stored in policy server 140. layer 3 access table 846 may be forwarded to firewall 160 when layer 3 access table 846 is changed or when policy server 140 or firewall 160 is turned on.

Exemplary Processing

Figure 10:
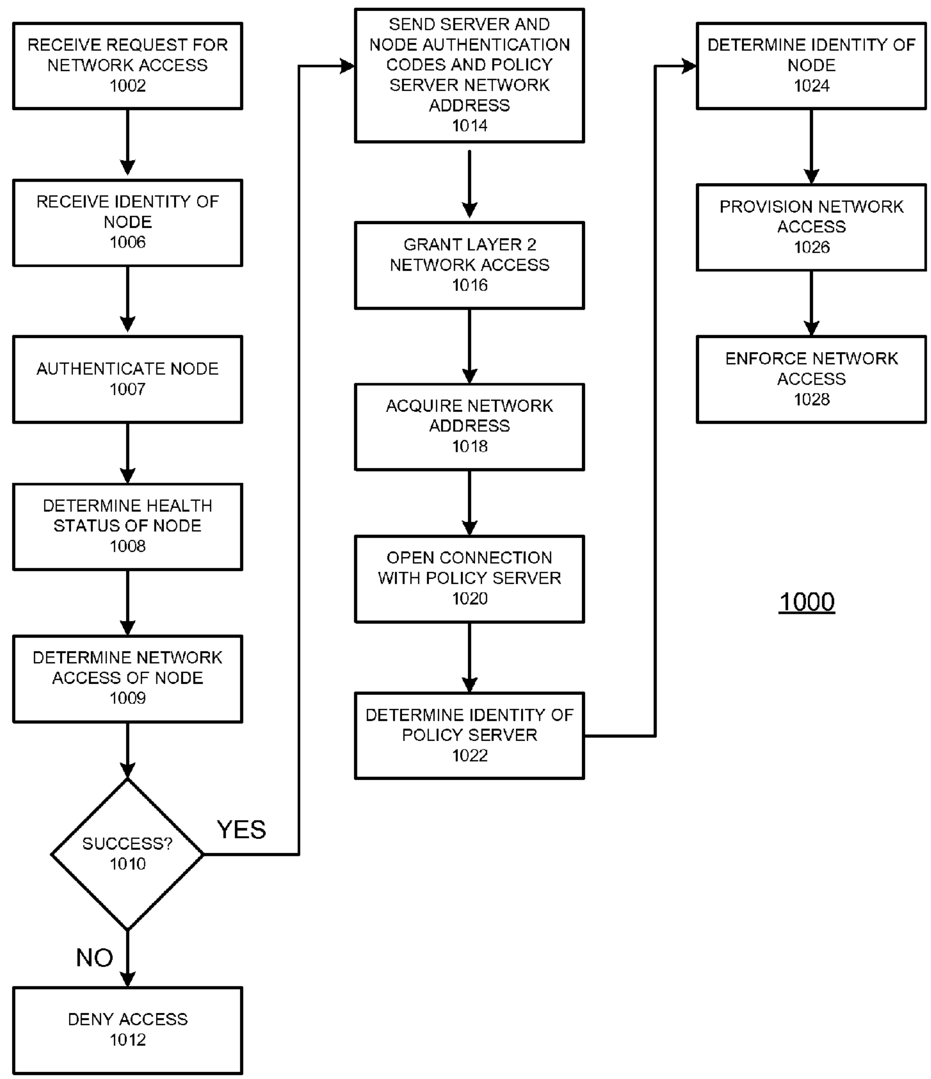
FIG. 10 is a flow chart of an exemplary process for authentication and authorization for a node in a network.

FIG. 10 is a flow chart of an exemplary process 1000 for authentication and authorization for a node in a network. Exemplary process 1000 is described below in relation to exemplary environment 100. Process 1000 may begin with username JONES or username SMITH or username VISITOR using node 110 attempting to access networks 120 and/or 125 with an authentication request, e.g., a connection request.

As shown in FIG. 10, a request to access network 120 may be received (block 1002). The request may include a layer 2 authentication request. In this example, NAS 130 may receive the authentication request from node 110 for a connection to network 120. NAS 130 may communicate with node 110 using 802.1X. The identity of the node may be received (block 1006). NAS 130 may use the RADIUS protocol to communicate with policy server 140. Communication between NAS 130 and policy server 140 may include sending EAP messages received from node 110 over 802.1X inside RADIUS messages. Communication between NAS 130 and policy server 140 may also include receiving EAP messages inside RADIUS messages and sending them to node 110 over 802.1X. The EAP messages that may be exchanged between node 110 and policy server 140 may use a secure protocol such as EAP-TLS, EAP-TTLS, or EAP-PEAP in order to protect the information exchanged between node 110 and policy server 140. In this manner, the identify of the node 110 may be received by the policy server 140. The identity of the node may include a username and password, a client certificate, and/or a token code. In one embodiment, policy server 140 may receive the identity of the node, which may include a username and/or a password. For example, node 110 may send a username of JONES and a password of IE1916 to policy server 140 through NAS 130.

The node may be authenticated (block 1007). Policy server 140 may communicate with user database server 150 to query user database 642 to authenticate node 110. For example, policy server 140 may send the username of JONES and the password of IE1916 to user database server 150.

User database server 150 may compare the username and password provided with usernames and passwords in username table 510. User database server 150 may respond to the query indicating whether authentication was successful or not. For example, user database may receive the username JONES and the password IE1916 from policy server 140 and compare it to entries in user database 642. In this example, because there is a match, user database server 150 may respond to policy server 140 that authentication was successful. In addition to responding that authentication was successful, user database server 150 may send attributes and/or group membership information about the user to policy server 140.

The health status of the node may be determined (block 1008). The health status may be healthy or not healthy, for example. In one embodiment, if the node has up-to-date virus protection, then the health status may be healthy. Otherwise, the health status may be not healthy. NAS 130 and/or policy server 140 may determine the health status of the node by interrogating the node. In some embodiments NAS 130 and/or policy server 140 may determine the health status of the node prior to receiving identity information from node 110.

The network access of the node may be determined (block 1009). Policy server 140 may use the identity of the username, attributes and group membership of the username, and the health status of the node to evaluate network access policies that determine what type of network access the node may have. In other words, the identity, attributes and group membership, and health status of the node may be factors that may influence the type or extent of access node 110 has to the network. Policy server 140 may access role mapping table 344 to determine the roles to accord a username and/or node.

For example, username SMITH may authenticate from a node with anti-virus software running, username JONES authenticates from a node with no anti-virus software funning, and username VISITOR authenticates from a node with anti-virus software funning. As a result, and according to role mapping table 344, username SMITH has the roles of EMPLOYEE, MAIL, DOCS, and HEALTHY; username JONES has the roles of EMPLOYEE, and MAIL; username VISITOR has the roles of GUEST and HEALTHY. Policy server 140 may update CST 348 to reflect this role information in field 520, for example.

Policy server 140 may traverse layer 2 policy table 346, for example, to assign layer 2 access to a node or username. In the example above, the node with username JONES may be placed on the VLAN identified as QUARANTINE VLAN because username JONES does not have a HEALTHY role. The node with username VISITOR may be placed on the VLAN identified as GUEST VLAN because username VISITOR has a GUEST role (and a HEALTHY role). The node with username SMITH may be placed on the VLAN identified as ACCESS VLAN because username JONES has an EMPLOYEE role (and a HEALTHY and not a GUEST role). In one embodiment, policy server 140 may traverse layer 2 policy table from top to bottom and may assign the first VLAN identified in VLAN field 436 where the username/node matches the role field 432.

If authentication is not successful (block 1010:NO), access may be denied (block 1012). If authentication is successful (block 1010:YES), layer 2 network access may be granted (block 1014) according to the appropriate network access determined in block 1009. CST 348 may be updated. In this example, policy server 140 may create a record in CST 348, such as the record for session 112. When creating the record for session 112, a session ID and node authentication code may be created. For example, user SMITH may use node 110 to establish session 112 is assigned a session ID of 70F866 and a node authentication code of A5DF9087. CST 348 may also be updated with the roles afforded node 110 in session 112.

Authentication information may be sent to the node (block 1014). In this example, authentication information may include (1) the node authentication code, e.g., A5DF9087, (2) a server authentication code, and (3) the network address, e.g., IP address, of policy server 140. In one embodiment, the node authentication code may include a random and/or cryptographically generated string. In one embodiment, the server authentication code may include a cryptographic hash of policy server 140's security certificate, which may be used to establish a secure layer 3 connection (such as TLS or SSL) between node 110 and policy server 140. As described below, the server authentication code may be used in future communications to determine that a policy server, such as policy server 140, is the same policy server as in past communications. Further, the node authentication code may be used in future communications to determine that a node, such as node 110, is the same node as in past communications.

Policy server 140 may respond to NAS 130 with information regarding whether access was granted or denied and what type or extent of access node 110 may have (block 1016). For example, policy server 140 may tell NAS 130 which VLAN node 110 should be connected to.

A network address, such as a layer 3 network address, may be assigned to the node (block 1018). Node 110 may request a network address, e.g., IP address, using the dynamic-host configuration protocol (DHCP). A DHCP server may assign an IP address to node 110. A network connection may be opened between the node and the policy server 140 (block 1020). For example, node 110 may open a TLS or SSL connection to policy server 140 using policy server 140's network address, e.g., IP address, which node 110 learned in block 1014. The identity of the policy server may be determined (block 1022). Node 110 may determine, e.g., verify, the identity of policy server 140 by requesting the server authentication code. If the requested server authentication code corresponds to the previously provided server authentication code in block 1016, node 110 may verify that it is communicating with the same policy server 140 and not a rogue policy server.

The identity of the node may be determined (block 1024). Policy server 140 may determine, e.g., verify, the identity of node 110 by receiving the authentication code provided in block 1016. If the received node authentication code corresponds to the node authentication code previously provided in block 1014, policy server 140 may determine that it is communicating with the same node 110 and not a rogue or unauthenticated node. After identification of the node, the node may be granted network access on layer 3 as well as on layer 2. Identifying the node in block 1024 may avoid policy server 140 from having to separately authenticate node 110 on layer 3, for example, by requesting another username and password. In one embodiment, however, policy server 140 may choose to authenticate node 110 on layer 3 as described below with respect to FIG. 11.

Network access may be provisioned (block 1026). Policy server 140 may provision network access for node 110 through firewall 160. Policy server 140 may send to firewall 160 the network address of a node, such as node 110, along with information about which network resources the node may be allowed to access, e.g., the roles accorded the node or username. Policy server 140 may send the network addresses of nodes and the corresponding roles to firewall 160 so that firewall 160 may populate address/role table 848. For example, policy server may send the following information to firewall 160 for entry into address/role table 848: 1.2.3.6 [JONES], EMPLOYEE, MAIL; 1.2.3.7 [SMITH], EMPLOYEE, MAIL, DOCS, HEALTHY; 1.2.3.8 [VISITOR], GUEST, HEALTHY. In one embodiment, policy server 140 may provide information to both node 110 and firewall 160, which may enable the two devices to establish an IPsec tunnel between them, for example, which may thwart IP address spoofing attacks. In one embodiment, firewall 160 may query policy server 140 when firewall receives network traffic from an unrecognized network address.

Network access may be enforced (block 1028). In one embodiment, firewall 160 enforces layer 3 network access. Firewall 160 may receive a first packet, including a source address, in a flow of packets. Firewall may traverse address/role table 848 for the source network address to determine the roles for the username/node that sent the packet. Firewall 160 may then traverse layer 3 policy table 846 from, for example, top to bottom. Firewall 160 may take action specified in action field 906 in the first record that matches the determined roles and destination network address.

For example, firewall 160 may receive a packet with a source address of 1.2.3.7 [SMITH] to 192.168.1.3 [MAIL SERVER]. Firewall 160 determines that the source address of 1.2.3.7 [SMITH] has EMPLOYEE, MAIL, DOCS, and HEALTHY privileges. Firewall 160 may then traverse layer 3 policy table 846. The first record in policy table 846 to match the relevant criteria is record 926, with a destination address of 192.168.1.3 [MAIL SERVER] and role of MAIL. Firewall 160 may then permit the packet to pass through firewall to protected network 125.

Figure 11:
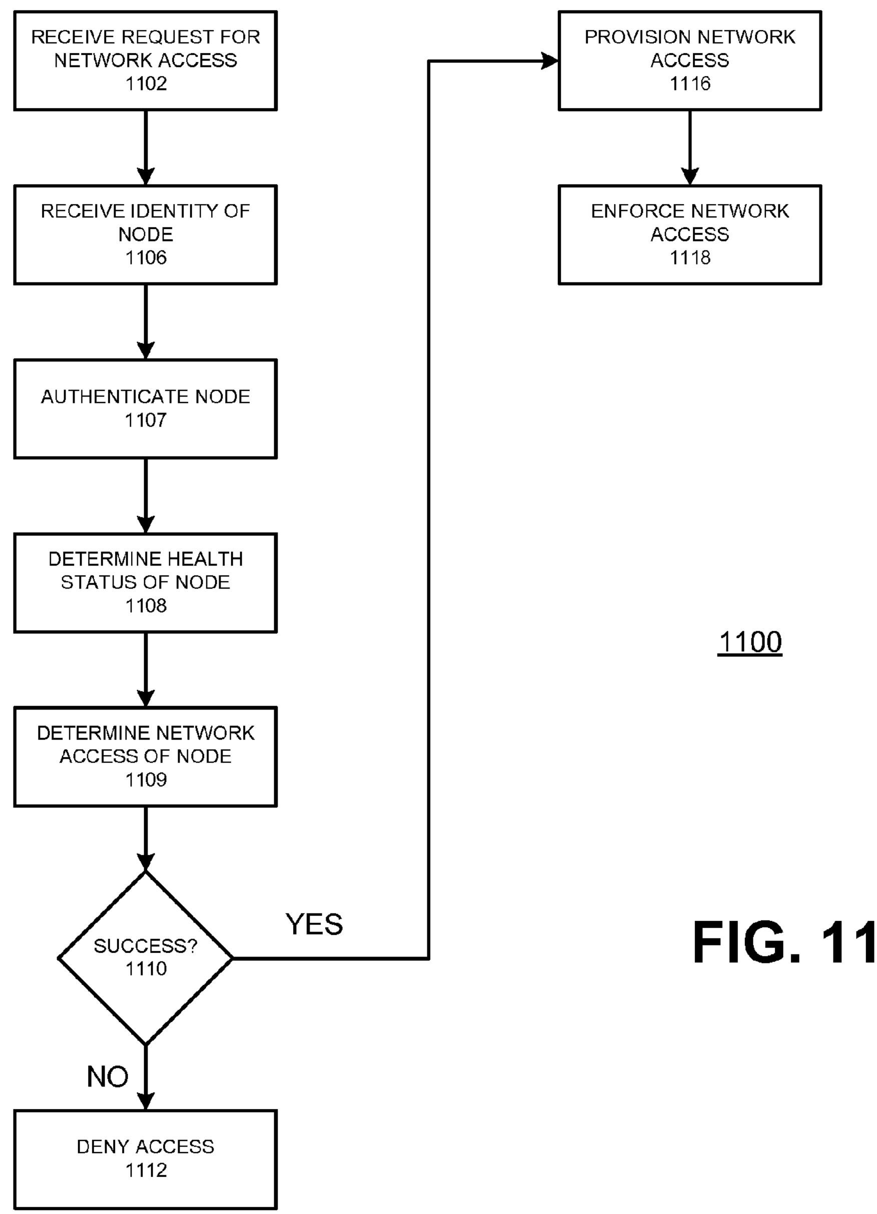
FIG. 11 is a flow chart of an exemplary process for authentication and authorization for a node in a network.

FIG. 11 is a flow chart of an exemplary process 1100 for authentication and authorization for a node in a network. More specifically, exemplary process 1100 shows layer 3 authentication. A node, such as node 110 may already have layer 2 access to the network and may request layer 3 authentication when, for example, requesting resources from network 120 that requires layer 3 authentication. The node may have obtained layer 2 access by traversing blocks 1002 through 1014 in FIG. 10. Alternatively, the node may have obtained layer 2 access by attaching to a NAS which does not require authentication for network access. In one embodiment, policy server 140 may use different authentication servers for layer 2 and layer 3 access.

As shown in FIG. 11, a request for access to network 120 may be received (block 1102). The request may include a layer 3 authentication request. A network connection may be opened between the node and the policy server 140. For example, node 110 may open a TLS or SSL connection to policy server 140 using policy server 140's network address, e.g., IP address. Policy server 140 may establish an encrypted SSL or TLS tunnel for the safe transport of authentication data. Policy server 140 may receive the identity of the node (block 1106). For example, the identity of node 110 may include a username, such as JONES, and/or password, such as IE1916.

The node may be authenticated (block 1107). Policy server 140 may communicate with user database server 150 to query user database 642 to authenticate node 110. For example, policy server 140 may send the username of JONES and the password of IE1916 to user database server 150. User database server 150 may compare the username and password provided with usernames and passwords in username table 510. User database server 150 may respond to the query indicating whether authentication was successful or not. For example, user database may receive the username JONES and the password IE1916 from policy server 140 and compare it to entries in user database 642. In this example, because there is a match, user database server 150 may respond to policy server 140 that authentication was successful. In addition to responding that authentication was successful, user database server 150 may send attributes and/or group membership information about the user to policy server 140. In one embodiment, user database server 150 may use the same username table, e.g., username table 510, that may be used for layer 2 authentication described above in FIG. 10. In another embodiment, user database server 150 may use a different username table other than username table 510.

The health status of the node may be determined (block 1108). The health status may be healthy or not healthy, for example. In one embodiment, if the node has up-to-date virus protection, then the health status may be healthy. Otherwise, the health status may be not healthy. NAS 130 and/or policy server 140 may determine the health status of the node by interrogating the node. In some embodiments NAS 130 and/or policy server 140 may determine the health status of the node prior to receiving identity information from node 110.

The network access of the node may be determined (block 1109). Policy server 140 may use the identity of the username, attributes and group membership of the username, and the health status of the node to evaluate network access policies that determine what type of network access, e.g., roles, the node may have. In other words, the identity, attributes and group membership, and health status of the node may be factors that may influence the type or extent of access node 110 has to the network. Policy server 140 may access role mapping table 344 to determine the roles to accord a username and/or node.

If authentication is not successful (block 1110:NO), access may be denied (block 1112). If authentication is successful (block 1110:YES), layer 3 network access may be granted (block 1014) according to the appropriate network access determined in block 1009. CST 348 may be updated. In this example, policy server 140 may create a record in CST 348, such as the record for session 112.

Network access may be provisioned (block 1116). Policy server 140 may provision network access for node 110 through firewall 160. Policy server 140 may send to firewall 160 the network address of a node, such as node 110, along with information about which network resources the node may be allowed to access, e.g., the roles accorded the node or username. Policy server 140 may send the network addresses of nodes and the corresponding roles to firewall 160 so that firewall 160 may populate address/role table 848.

Network access may be enforced (block 1118). In one embodiment, firewall 160 enforces layer 3 network access. Firewall 160 may receive a first packet, including a source address, in a flow of packets. Firewall may traverse address/role table 848 for the source network address to determine the roles for the username/node that sent the packet. Firewall 160 may then traverse layer 3 policy table 846 from, for example, top to boom. Firewall 160 may take action specified in action field 906 in the first record that matches the determined roles and destination network address.

Policy server 140 may update CST 348, at any time regarding any session established for any node. For example, policy server 140 may update CST 348 at authentication requests and corresponding responses and/or at authorization requests and corresponding responses. Policy server 140 and firewall 160 may send information to monitoring computer 170 regarding network access provided to node 110. In an embodiment where policy server 140 queries the same authentication rules, e.g., username database, for both layer 2 and layer 3 authentication, monitoring computer may provide a single log of the accounting for the access by a node to resources in the network over both layer 2 and layer 3.

Conclusion

Embodiments described herein may provide for layer 2 and layer 3 authentication and authorization requests. Embodiments described herein may provide for layer 3 network access based on a previous layer 2 authentication.

The descriptions of FIGS. 2, 3, 6, and 8 above each include a discussion of software instructions contained on computer-readable media. Alternatively, in each of these implementations, hardwired circuitry may be used in place of or in combination with software instructions to implement processes described herein. Thus, implementations described herein are not limited to any specific combination of hardware circuitry and software.

It will be apparent that aspects, as described above, may be implemented in many different forms of software, firmware, and hardware in the implementations illustrated in the figures. The actual software code or specialized control hardware used to implement aspects is not limiting of the present invention. Thus, the operation and behavior of the aspects were described without reference to the specific software code—it being understood that software or control hardware could be designed to implement the aspects based on the description herein.

Further, although processes 1000 and 1100 in FIGS. 10 and 11 indicate a certain order of blocks, the blocks in these figures may be arranged in any order. In addition, implementations described herein may use the internet-protocol (IP), asynchronous transfer mode (ATM) protocol, or any other type of network protocol. As such, implementations described herein may use IP addresses, ATM addresses, or any other type of network addresses. As shown above, network addresses may be stored in a format such as 1.2.3.4. In another embodiment, network addresses, such as IP addresses, may be stored as an integer.

No element, act, or instruction used in the present application should be construed as critical or essential to the invention unless explicitly described as such. Also, as used herein, the article “a” is intended to include one or more items. Where only one item is intended, the term “one” or similar language is used. Further, the phrase “based on” is intended to mean “based, at least in part, on” unless explicitly stated otherwise.

What is claimed:

1. A method comprising:

receiving, by a first device, identification information of a user of a second device that is different than the first device;

providing, by the first device and to the second device, layer 2 access in a network when the second device is authenticated over layer 2 based on the identification information;

determining, by the first device and based on the identification information, one or more resources, in the network, that the user is authorized to access;

sending to the second device and when the second device is authenticated:

a network address of the first device, first information that is based on the determined one or more resources, and second information that is used by the second device to verify an identity of the first device;

receiving, by the first device and from the second device, a request to verify the identity of the first device after sending the second information to the second device, the request to verify the identity of the first device being sent by the second device using the network address of the first device;

providing, by the first device and to the second device, the second information to verify the identity of the first device, after receiving the request to verify the identity of the first device;

receiving, by the first device and from the second device, third information after providing the second information to verify the identity of the first device; and providing, by the first device and to the second device, layer 3 access in the network, when the third information corresponds to the first information.

2. The method of claim 1, further comprising:

determining a health status of the second device, where determining the one or more resources includes determining the one or more resources further based on the health status of the second device.

3. The method of claim 2, further comprising:

determining that the second device is healthy when the second device is running an up-to-date anti-virus software, where determining the one or more resources includes determining the one or more resources further based on determining that the second device is healthy.

4. The method of claim 1, further comprising:

storing, in a memory of the first device, a plurality of:

the identification information of the user, information identifying the one or more resources, or information identifying a health status of the second device.

5. The method of claim 4, further comprising:

sending, to a firewall device, the plurality of:

the identification information of the user, the information identifying the one or more resources, or the information identifying the health status of the second device, to permit the firewall device to enforce the layer 3 access in the network based on the plurality of:

the identification information of the user, the information identifying the one or more resources, or the information identifying the health status of the second device.

6. The method of claim 1, further comprising:

receiving the identification information of the user from a third device different than the first device and the second device.

7. The method of claim 1, further comprising:

determining whether the second device is authenticated over layer 2 based on the identification information; and denying layer 2 access in the network when the second device is not authenticated over layer 2 based on the identification information.

8. A device comprising:

a non-transitory memory to store instructions; and a processor to execute the instructions to:

determine whether another device is authenticated over layer 2 based on identification information of a user of the other device, provide, to the other device, layer 2 access in a network when the other device is authenticated over layer 2 based on the identification information, determine, based on the identification information, one or more resources, in the network, that the user is authorized to access, send to the other device when the other device is authenticated:

a network address of the device, first information that is based on the determined one or more resources, and second information that is used by the other device to verify an identity of the device, receive, from the other device, a request to verify the identity of the device after sending the second information to the other device, the request to verify the identity of the device being sent by the other device using the network address of the device, provide, to the other device, the second information to verify the identity of the device, after receiving the request to verify the identity of the device, receive, from the other device, third information after providing the second information to verify the identity of the device, and provide, to the other device, layer 3 access in the network, when the third information corresponds to the first information.

9. The device of claim 8, where the device corresponds to a first device and the other device corresponds to a second device, and where the processor is further to:

receive the identification information of the user from a third device different than the first device and the second device.

10. The device of claim 8, where the processor is further to:

deny layer 2 access in the network when the second device is not authenticated over layer 2.

11. The device of claim 8, where the processor is further to:

determine whether an anti-virus software is installed on the other device, and determine whether the other device is healthy based on determining whether the anti-virus software is installed on the other device, where, when determining the one or more resources, the processor is to determine the one or more resources further based on determining whether the other device is healthy.

12. The device of claim 11, where the processor is further to:

determine that the anti-virus software is installed on the other device, and determine that the other device is healthy based on determining that the anti-virus software is installed on the other device, where, when determining the one or more resources, the processor is to determine the one or more resources further based on determining that the other device is healthy.

13. The device of claim 8, where the processor is further to:

store in the non-transitory memory:

the identification information of the user, information identifying the one or more resources, and information identifying a health status of the second device.

14. The device of claim 13, where the processor is further to:

send, to a firewall device, the identification information of the user, the information identifying the one or more resources, and the information identifying a health status of the other device to permit, the firewall device to enforce layer 3 access in the network based on the identification information of the user, the information identifying the one or more resources, and the information identifying the health status of the other device.

15. A non-transitory computer-readable medium storing instructions, the instructions comprising:

one or more instructions which, when executed by a device, cause the device to determine that another device is authenticated over layer 2 based on identification information of a user of the other device;

one or more instructions which, when executed by the device, cause the device to provide, to the other device, layer 2 access in a network based on the other device being authenticated over layer 2;

one or more instructions which, when executed by the device, cause the device to determine, based on the identification information, one or more resources, in the network, that the user is authorized to access;

one or more instructions which, when executed by the device, cause the device to send to the other device based on the other device being authenticated:

a network address of the device, first information that is based on the determined one or more resources, and second information that is used by the other device to verify an identity of the device;

one or more instructions which, when executed by the device, cause the device to receive, from the other device, a request to verify the identity of the device after sending the second information to the other device;

one or more instructions which, when executed by the device, cause the device to provide, to the other device, the second information to verify the identity of the device, after receiving the request to verify the identity of the device, the request to verify the identity of the device being sent by the other device using the network address of the device;

one or more instructions which, when executed by the device, cause the device to receive, from the other device, third information after providing the second information to verify the identity of the device; and one or more instructions which, when executed by the device, cause the device to provide, to the other device, layer 3 access in the network, when the third information corresponds to the first information.

16. The non-transitory computer-readable medium of claim 15, where the device corresponds to a first device and the other device corresponds to a second device, the instructions further comprising:

one or more instructions to receive the identification information of the user from a third device different than the first device and the second device.

17. The non-transitory computer-readable medium of claim 15, the instructions further comprising:

one or more instructions to determine that the other device is healthy based on an anti-virus software that is installed on the other device, where the one or more resources are determined further based on determining that the other device is healthy.

18. The non-transitory computer-readable medium of claim 15, the instructions further comprising:

one or more instructions to send, to a firewall device, the identification information of the user, information identifying the one or more resources, and information identifying a health status of the other device to permit the firewall device to enforce layer 3 access in the network based on the identification information of the user, the information identifying the one or more resources, and the information identifying the health status of the other device.

19. The non-transitory computer-readable medium of claim 15, the instructions further comprising:

one or more instructions to determine whether the other device is authenticated over layer 2 based on the identification information; and one or more instructions to deny layer 2 access in the network when the other device is not authenticated over layer 2 based on the identification information.

20. The non-transitory computer-readable medium of claim 15, the instructions further comprising:

one or more instructions to store, in a memory of the device, a plurality of:

the identification information of the user, information identifying the one or more resources, or information identifying a health status of the other device; and one or more instructions to send, to a firewall device, the plurality of the identification information of the user, the information identifying the one or more resources, or the information identifying a health status of the other device to permit the firewall device to enforce layer 3 access in the network based on the plurality of the identification information of the user, the information identifying the one or more resources, or the information identifying the health status of the other device.

* * * * *